US008467200B2

(12) United States Patent
Pan et al.

(10) Patent No.: US 8,467,200 B2
(45) Date of Patent: Jun. 18, 2013

(54) POWER CONVERTER FOR A POWER GENERATOR

(75) Inventors: Shangzhi Pan, Kingston (CA); Sayed Ali Khajehoddin, Kingston (CA); Praveen K. Jain, Kingston (CA); Alireza Bakhshai, Kingston (CA)

(73) Assignee: Queen's University at Kingston, Kingston (CA)

( * ) Notice: Subject to any disclaimer, the term of this patent is extended or adjusted under 35 U.S.C. 154(b) by 242 days.

(21) Appl. No.: 13/094,260

(22) Filed: Apr. 26, 2011

(65) Prior Publication Data

US 2011/0261593 A1    Oct. 27, 2011

Related U.S. Application Data

(60) Provisional application No. 61/328,024, filed on Apr. 26, 2010, provisional application No. 61/363,031, filed on Jul. 9, 2010.

(51) Int. Cl.
  *H02M 1/12* (2006.01)

(52) U.S. Cl.
  USPC .......................................... 363/21.02; 363/40

(58) Field of Classification Search
  USPC .................... 363/15, 16, 20, 21.01, 21.02, 34, 363/39, 40, 45, 123, 131
  See application file for complete search history.

(56) References Cited

U.S. PATENT DOCUMENTS

| 3,435,323 | A  |   | 3/1969  | Wieder |
| 6,414,866 | B2 | * | 7/2002  | Huggett et al. .............. 363/124 |
| 7,626,834 | B2 |   | 12/2009 | Chisenga et al. |
| 8,193,788 | B2 | * | 6/2012  | Chapman ..................... 323/259 |
| 8,279,649 | B2 | * | 10/2012 | Esram et al. .................. 363/132 |
| 8,284,574 | B2 | * | 10/2012 | Chapman et al. .............. 363/41 |
| 8,324,829 | B2 | * | 12/2012 | Nakada et al. ................ 315/291 |
| 8,362,648 | B2 | * | 1/2013  | Matsui et al. .................. 307/75 |
| 2002/0001211 | A1 | * | 1/2002 | Huggett et al. .............. 363/124 |
| 2009/0086520 | A1 | * | 4/2009 | Nishimura .................... 363/133 |
| 2009/0312885 | A1 | * | 12/2009 | Buiel .......................... 700/297 |
| 2010/0080028 | A1 |   | 4/2010 | Cheng et al. |
| 2010/0097827 | A1 |   | 4/2010 | Ben-Yaakov |
| 2010/0236612 | A1 |   | 9/2010 | Khajehoddin et al. |
| 2011/0130889 | A1 |   | 6/2011 | Khajehoddin et al. |
| 2011/0264288 | A1 |   | 10/2011 | Khajehoddin et al. |

FOREIGN PATENT DOCUMENTS

WO    WO 2010/029345    3/2010

OTHER PUBLICATIONS

International Search Report for International Application No. PCT/CA2011/000475 filed on Apr. 26, 2011.
Written Opinion for International Application No. PCT/CA2011/000475 filed on Apr. 26, 2011.

* cited by examiner

*Primary Examiner* — Adolf Berhane
(74) *Attorney, Agent, or Firm* — Stephen J. Scribner

(57) ABSTRACT

Provided are methods, circuits, and systems for obtaining power from a power generator such as a photovoltaic cell or a fuel cell. The methods, circuits, and systems comprise converting substantially DC output power from the power generator into a high frequency AC voltage while rejecting or minimizing oscillations in the output power from the power generator; converting the high frequency AC voltage into a high frequency substantially sinusoidal voltage or current; and converting the high frequency substantially sinusoidal AC voltage or current into (i) a DC voltage or current, and (ii) a low frequency substantially sinusoidal AC voltage or current; wherein the high frequency substantially sinusoidal AC voltage or current is isolated from the DC voltage or current or the low frequency substantially sinusoidal AC voltage or current.

36 Claims, 15 Drawing Sheets

POWER CONVERTER FOR A POWER GENERATOR

RELATED APPLICATIONS

This application claims the benefit of the filing dates of U.S. Provisional Patent Application No. 61/328,024, filed on 26 Apr. 2010 and U.S. Provisional Patent Application No. 61/363,031, filed on 9 Jul. 2010, the contents of which are incorporated herein by reference in their entirety.

FIELD

This invention relates to circuits, systems, and methods for converting power obtained from a power generator. The circuits, systems, and methods described herein may be used to interface a power generator to a power distribution grid.

BACKGROUND

Grid-connected power generation systems typically include two major parts: power generators that produce the power and converters that receive, condition, and inject the power into the power distribution grid. Power generators include, for example, photovoltaic (PV) cells, fuel cells, and wind turbines.

To increase the overall efficiency of power generators under different circumstances, such as partial shadowing of PV cells, or mismatches between PV cells or wind turbines, independent control and power extraction is required for each power generator. This requires using a separate converter for each power generator. This may be referred to as micro-inverter technology.

In single-phase grid-connected power generation systems, the instantaneous output power oscillates at twice the grid frequency. In systems where the power generators are PV cells, the input power generation is DC and thus oscillation of the instantaneous power at the converter output, if reflected in the input, causes the input operating point to deviate from DC. If there is any power oscillation on the PV cell side, maximum power is only achievable at the peak of oscillation, which translates into less average power extraction than the available maximum power [1,2]. This is a power loss that reduces the efficiency of the PV cell system. Therefore, power pulsation is a key problem in such systems and the PV cell converter should decouple the output power pulsation from the input DC power generation to maximize the efficiency.

As noted above, if there is no power decoupling in a single-phase inverter, the power generation at the PV cell terminal will contain oscillations that result in a deviation from the optimum point. Energy storage in the circuit may supply oscillatory power and reduce power pulsation at the PV cell terminal. The decoupling problem is normally resolved by using large electrolytic capacitors (e.g., in the range of milli-Farads) to minimize the effect of the output power pulsation on the input operating point. However, this is highly undesirable because it decreases the life-time and increases the volume, weight, and cost of the inverter.

Depending on the topology, different locations of the energy storage are possible. For example, for a single-stage topology energy storage may be implemented at the PV cell terminals. For multi-stage topologies, when a voltage source inverter is employed at the output, the power decoupling capacitor may be placed at the input terminals and/or at the DC bus (e.g., between DC-DC converter and DC-AC inverter stages). It is beneficial to have most of the decoupling capacitance on the DC bus because the voltage level is higher and the same amount of energy storage can be achieved with a smaller capacitor.

The generation of a high DC voltage is not efficient and it poses an excessive voltage stress on the inverter and on the output of the first stage. Moreover, the high voltage on the bus enlarges high frequency ripples on the output current, which requires large passive filters for compensation. Further, in such an approach relatively large electrolytic capacitors at the input are still needed to remove any oscillations at the PV cell input.

Use of a voltage source inverter at the output requires a bulky inductor for connection to the grid. To avoid this, a micro-inverter may use an unfolding power circuit in the last stage. However, with this approach, a large electrolytic capacitor bank is still required at the PV cell terminals because the voltage level is very low and the amount of capacitance required becomes large. In general, topologies that use a transformer as an energy buffer employ such a configuration for power decoupling [1,2,5].

To reduce the amount of input capacitance required, a multistage approach may be used as in [3] which processes the full output power. However, this reduces the efficiency and increases the size and weight of the converter. Moreover, since the DC bus voltage is very high the stress on the switches of the converter stages is very high and also the filter that shapes the current becomes relatively large.

In other approaches [5-10], an auxiliary power circuit is introduced that absorbs power and provides energy when needed. As a result a large electrolytic capacitor is not required. The auxiliary power circuit usually operates at high voltage to reduce the energy storage component. Such approaches generally have low efficiency and have high number of power processing stages.

SUMMARY

Described herein is a power converter for use with a power generator, comprising: a high side input point and a low side input point for receiving substantially DC power from the power generator; a capacitor connected across the high side and low side input points; a first means that receives voltage across the capacitor and converts the voltage into a high frequency AC voltage while rejecting or minimizing oscillations in the received voltage; a second means that converts the high frequency AC voltage into a substantially sinusoidal AC voltage or current; an isolating transformer that receives the substantially sinusoidal AC voltage or current; a third means that converts a high frequency substantially sinusoidal AC voltage or current from the transformer into (i) a low frequency substantially sinusoidal AC output voltage or current; and (ii) a DC output voltage or current; and a high side output point and a low side output point for outputting the output voltage or current.

In one embodiment the high frequency AC voltage may be amplitude modulated by a substantially sinusoidal voltage at a frequency that is related to a power distribution grid frequency.

The first means may comprise a chopper circuit. Switches of the chopper circuit may be controlled using pulse width modulation. The second means may comprise a resonant circuit. The resonant circuit may be a series resonant circuit. The third means may comprise a rectifier and optional filter, wherein the output is a DC voltage or current. The third means may comprise a rectifier and an inverter, wherein the output is an AC voltage or current.

Also described herein is a micro-inverter for a distributed power generator, comprising: the power converter described above; and a controller that controls operation of switches in the first means by comparing the voltage across the capacitor with a reference voltage so as to minimize voltage fluctuations across the capacitor. The controller may include one or more of a modified pulse width modulator, a duty cycle controller, and a maximum power point tracker. The duty cycle controller may comprise a proportional integral-derivative compensator.

Also described herein is a power generation system, comprising: at least one micro-inverter as described above; and at least one power generator. Each power generator may be connected to a micro-inverter.

Also described herein is a method for obtaining power from a power generator, comprising: converting substantially DC output power from the power generator into a high frequency AC voltage while rejecting or minimizing oscillations in the output power from the power generator; converting the high frequency AC voltage into a high frequency substantially sinusoidal voltage or current; and converting the high frequency substantially sinusoidal AC voltage or current into (i) a DC voltage or current, and (ii) a low frequency substantially sinusoidal AC voltage or current; wherein the high frequency substantially sinusoidal AC voltage or current is isolated from the DC voltage or current or the low frequency substantially sinusoidal AC voltage or current.

In one embodiment the method may include amplitude modulating the high frequency AC voltage by a substantially sinusoidal voltage at a frequency that is related to a power distribution grid frequency.

The method may comprise using a chopper to convert output power from the power generator into a high frequency AC voltage. The method may comprise using pulse width modulation to control one or more switches of the chopper circuit. The method may include comparing output voltage of the power generator with a reference voltage so as to minimize voltage fluctuations of the power generator. The method may comprise using a resonant circuit to convert the high frequency AC voltage into a high frequency substantially sinusoidal AC voltage or current. The resonant circuit may comprise a series resonant circuit. The method may comprise connecting the low frequency substantially sinusoidal output voltage or current to a power distribution grid.

In the above circuits, systems, and methods, the power generator may be a photovoltaic (PV) cell or a fuel cell.

BRIEF DESCRIPTION OF THE DRAWINGS

For a better understanding of the invention, and to show more clearly how it may be carried into effect, embodiments will now be described, by way of example, with reference to the accompanying drawings, wherein.

DETAILED DESCRIPTION OF EMBODIMENTS

Described herein are systems, circuits, and methods for obtaining power from a power generator. A power generator may be, for example, a wind turbine, a fuel cell, or a photovoltaic cell. The power generator may be a distributed power generator. Whereas embodiments of the systems, circuits, and methods are described herein primarily with respect to photovoltaic cells, it will be appreciated that the systems, circuits, and methods are not limited thereto.

Figure 1:
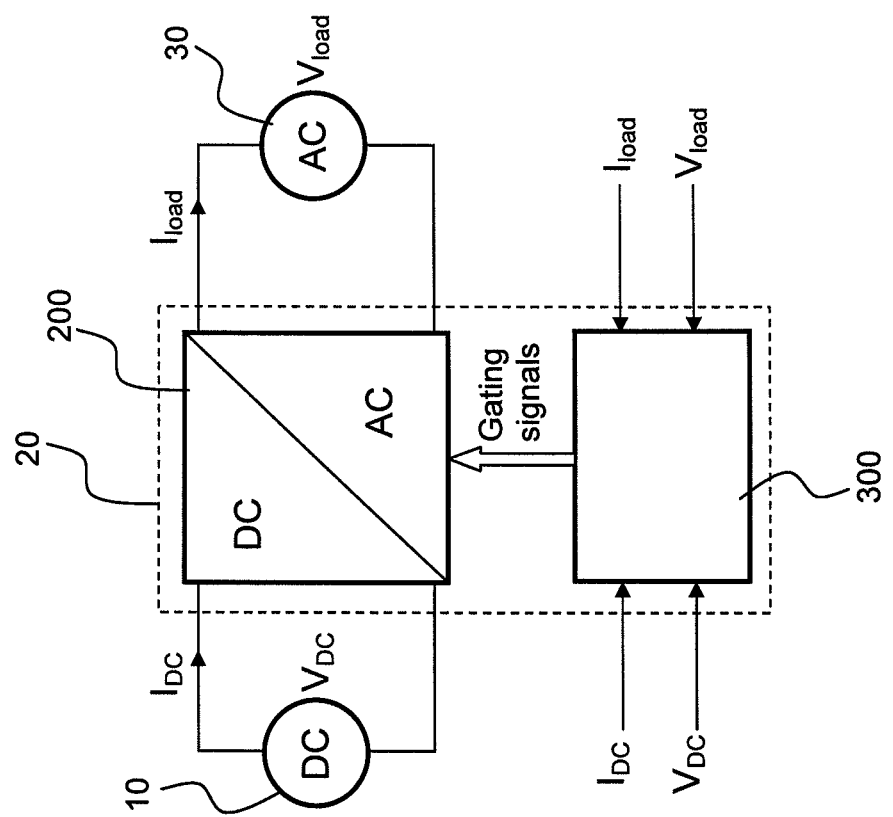
FIG. 1 is a generalized block diagram of a micro-inverter.

The systems, circuits, and methods described herein may be used in a micro-inverter for a power generator. As used herein, the term "micro-inverter" refers to a device that interfaces a power generator with a load, such as a power distribution grid. A system including a micro-inverter is shown in the generalized block diagram of FIG. 1. The micro-inverter 20 receives power from a power generator 10, and outputs power to a load 30. The micro-inverter 20 may include a power section 200 that may include one or more stages and perform one or more functions, such as, for example, DC-DC conversion, DC-AC conversion, or a combination thereof. The micro-inverter may include a control section 300 that may perform one or more functions such as, for example, maximum power point tracking of the power generator, and/or providing gating signals to the power section 200. The gating signals may be determined by sensing the power generator voltage and/or current, and/or the load voltage and/or current.

A micro-inverter as described herein increases the overall efficiency of power generation under different circumstances and conditions. For example, in the case of a PV cell, partial shadowing of the PV cell or mismatches between PV cells can degrade the overall efficiency of the system. However, use of a micro-inverter for each PV cell, or for a PV cell string or module, permits independent control and power extraction from each PV cell or PV cell string or module, maximizing power extraction from PV cells despite varying conditions of individual PV cells.

A micro-inverter as described herein is compact, so as to be attached to a PV cell (e.g., to the back of a PV cell). Since micro-inverters are exposed to a wide range of environmental conditions, such as extremes of temperature and humidity, reliability and maintenance of are major issues. This exposure also adversely affects the life expectancy and performance of the inverter. These factors demand robust design and construction, and may require more expensive components that lead to a higher manufacturing cost. Consequently, challenges in the design of a micro-inverter include achieving compactness and low cost, e.g., by reducing the number and size of circuit components. Advantageously, a micro-inverter as described herein does not require costly high voltage components and wiring.

In one embodiment, a micro-inverter may include one or more feature such as, for example, communication, inversion (i.e., DC to AC conversion), peak power tracking, islanding, etc. Such a micro-inverter may be integrated into a PV module. The term "PV module" refers to one or more PV cells connected in series, parallel, and/or series-parallel to effect a desired electrical output. For example, a PV module may be the smallest discrete unit provided (e.g., sold) to an end user of a photovoltaic conversion system. Typically, PV modules are supplied with connectors or other suitable hardware to extract the DC output from the module. However, as described herein, a micro-inverter may be integrated into a PV module, wherein such connectors or other suitable hardware to extract the DC output are replaced with a micro-inverter so as to obtain one or more electrical features, such as those described above. Moreover, such integration of the micro-inverter with the PV module may include packaging of the micro-inverter either substantially together or incorporated into the module packaging, or in a manner that substantially unifies the micro-inverter with the module packaging. The PV module packaging may be pre-existing or may be designed to accommodate the micro-inverter. It will be appreciated that the inversion portion of the micro-inverter may be of any design, such as, for example, but not limited to, current source, voltage source, resonant, etc., and may include single or multiple power stages.

The control section 300 of a micro-inverter as described herein may include maximum power point tracking (MPPT). As a result, MPPT may be performed on each power generator independently. In the case of PV cells, this is useful where partial shading cannot be avoided since MPPT allows the maximum power to be extracted from each PV cell for any instantaneous condition. MPPT removes any mismatch losses between PV cells in the system. Further, micro-inverters as described herein provide modularity to individual power generators, allowing a "plug and play" approach to their use in a distributed power generation system. The control section may be implemented in whole or in part using discrete components, using digital technology (e.g., in a digital signal processor (DSP), field programmable gate array (FPGA), or application specific integrated circuit (ASIC) device), or using a combination thereof. For example, one or more components of the control section may be implemented in an algorithm using a suitable hardware language such as, for example, very high speed integrated circuit (VHSIC) hardware descriptive language (VHDL), register transfer language (RTL), or Verilog. Such an algorithm may be implemented in, for example, a FPGA or ASIC device, or other suitable logic device. Use of digital technology provides a controller that is compact and robust.

As used herein, the terms "maximum power point tracking (MPPT)" and "maximum power point tracker (MPP tracker)" are distinct. "MPPT" refers to an algorithm and "MPP tracker" refers to hardware (i.e., a circuit). The MPPT calculates the optimum operating point for a distributed power generator such as a photovoltaic cell, and provides a reference point for MPP tracker to steer the system toward the optimum operating point.

As used herein, the term "photovoltaic cell (PV cell)" refers to any cell having a light absorbing material to absorb photons and generate electrons via a photoelectric effect. A non-limiting example of a photovoltaic cell is a solar cell. The light absorbing material may absorb light in any wavelength or combination of wavelengths, including, for example, wavelengths of solar light that reach the earth's surface, and/or wavelengths of solar light beyond the earth's atmosphere. Two or more light absorbing materials having specific wavelengths of light absorption may be used in combination to take advantage of different light absorption and charge separation mechanisms. The light absorbing material may be configured as, for example, bulk material, thin-film (e.g., inorganic layers, organic dyes, and organic polymers), and/or nanocrystals. Photovoltaic cells may be combined into arrays, strings, modules, or panels. For example, a photovoltaic cell string may include a plurality of photovoltaic cells connected together in a series, parallel, series-parallel, or other configuration. For simplicity, the term "PV cell" as used herein will refer to a single cell or any such combination of cells.

A review of existing micro-inverter topologies reveals that for power decoupling, electrolytic capacitors, very high bus voltage, or auxiliary power circuits are used. The former has life-time, size, and maintenance problems and the latter approaches mainly exhibit low efficiency, high number of stages, and/or high voltage stress which compromise performance.

Figure 2:
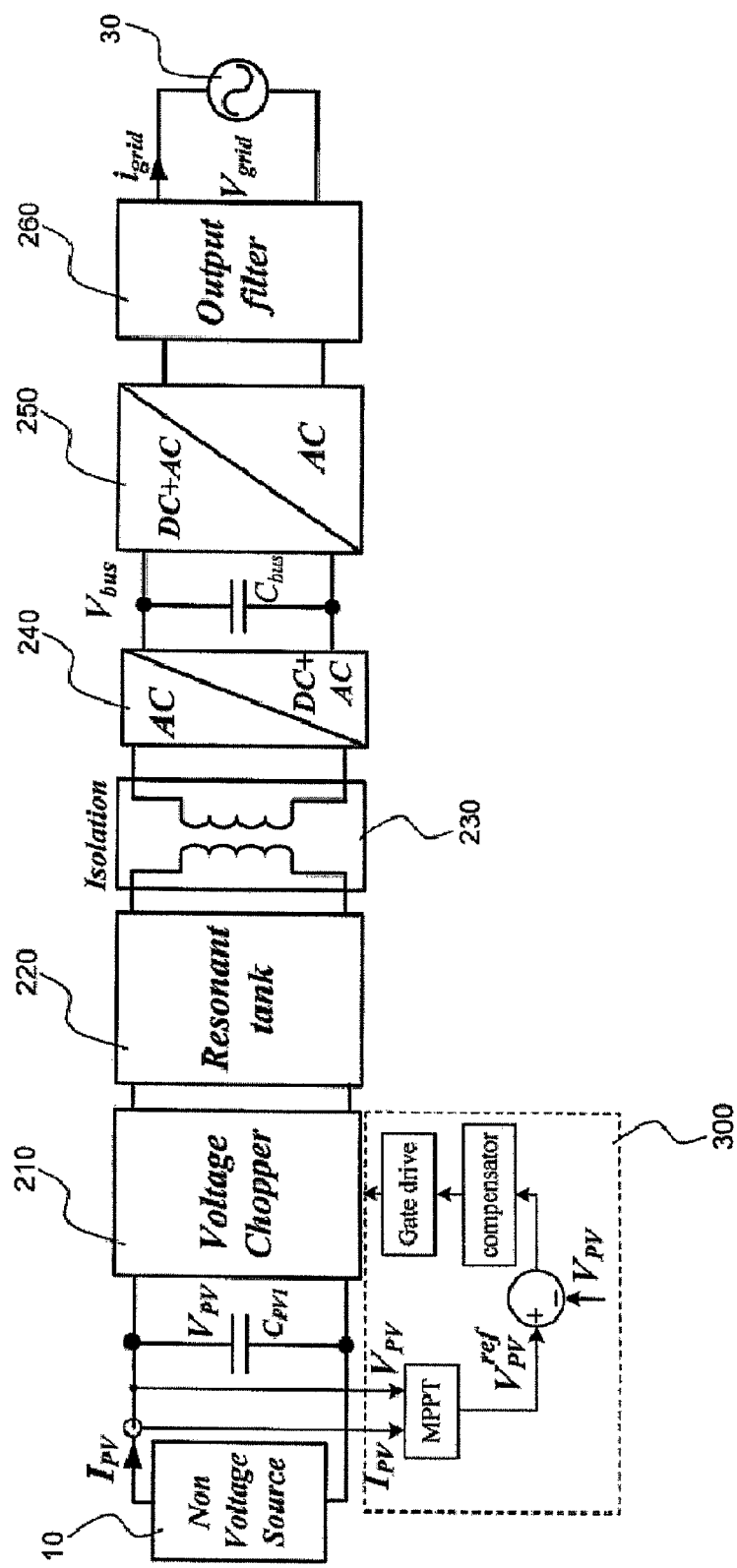
FIG. 2 is a block diagram of a micro-inverter according to one embodiment.

A micro-inverter topology as described herein overcomes the aforementioned problems. FIG. 2 shows a block diagram of an embodiment of the power circuit 200 together with a control section 300. Referring to FIG. 2, a capacitor $C_{PV1}$ is connected across the power generator 10 and the input of a voltage chopper 210. The voltage chopper topology may be, for example, half bridge or full bridge. From the voltage chopper, the circuit includes a resonant tank circuit 220, an isolation transformer 230, a first converter 240, a capacitor $C_{bus}$, a second converter 250, and an output filter 260. The converters may be voltage source converters. A half bridge or full bridge rectifier may be provided at the output of the isolation transformer. The control section 300 provides gate signals for the voltage chopper 210 and may also provide maximum power point tracking. The control section also provides decoupling and high switching frequency of the voltage chopper stage 210, to ensure that main power pulsations are drawn from the bus capacitor $C_{bus}$ and input power extraction is constant, while using only a small capacitor $C_{PV1}$ at the PV terminal. The decoupling method creates a DC plus AC voltage at the middle stage converter 240 and then uses a modified pulse width modulation (PWM) technique to remove double frequency harmonics from the output current. Therefore, the power pulsations have minimum impact on the input power extraction or output power injection. By accepting a large AC oscillation on the bus and controlling the average bus voltage, both the value of the bus capacitor and the voltage stress on the inverter may be optimized. For example, the input and bus capacitors may be reduced to less than 20 microFarad, an improvement of two or three orders of magnitude, relative to prior designs. As a result, the topology and control systems described herein yield a compact design suitable for micro-inverter application.

A micro-inverter as described herein employs an isolated resonant-mode topology using a high switching frequency. The high switching frequency (e.g., 10 kHz or higher) allows use of small circuit components, relative to a lower switching frequency, resulting in a high power density. In general, as the switching frequency increases, switching losses associated with turning on and off the active device(s) also increase, typically resulting in low conversion efficiency. However, in the embodiments described herein, the high switching frequency does not affect the efficiency of the circuit because a soft switching technique is employed. Soft switching refers to the switching of a device (i.e., turning the device on or off) when there is zero voltage across the device (i.e., zero voltage switching (ZVS)) or zero current through the device (i.e., zero current switching (ZCS)). That is, in a resonant-mode topology the switching losses are low, allowing operation of a resonant converter at a high switching frequency with low switching loss.

In one embodiment the isolated resonant-mode converter is a series resonant converter. This embodiment exhibits near zero switching losses while operating at constant and very high frequencies (e.g., 100 kHz or higher). The component count is low, making it feasible for micro-inverter applications.

Figure 3A:
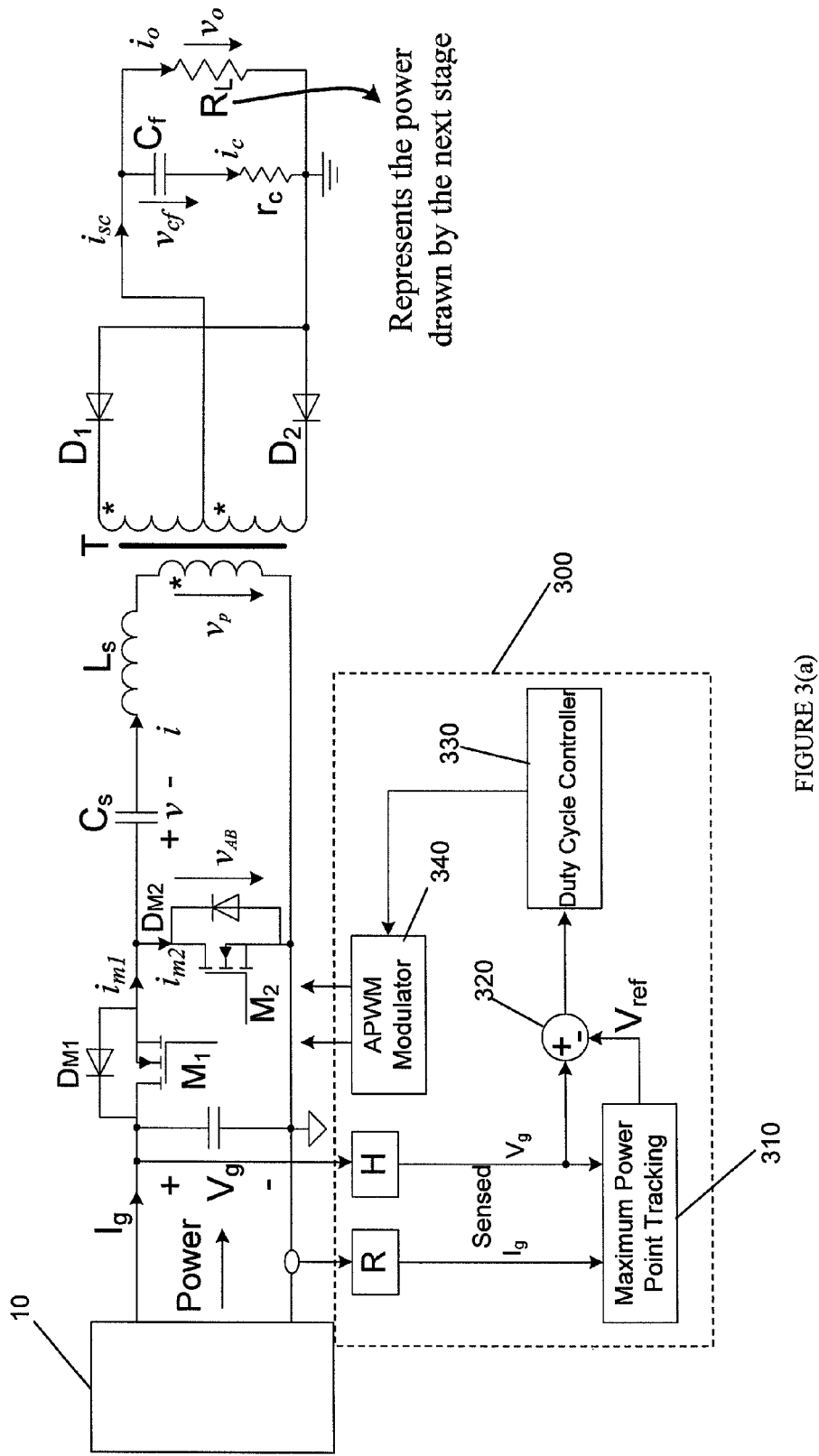
FIG. 3(a) is a circuit diagram of a micro-inverter with maximum power point tracking according to one embodiment.

The embodiment of FIG. 2 is suitable for obtaining power from a power generator and interfacing the power with an AC load, such as a power distribution system. FIG. 3(a) shows an exemplary circuit diagram of an embodiment without a converter stage 250 (see FIG. 2), but with a load $R_L$, wherein the output may be DC. This embodiment also employs a series resonant DC-DC converter. As shown in FIG. 3(a), the embodiment may include a control section 300, wherein maximum power point tracking (MPPT) may be employed. The power generator 10 may be a PV cell. The circuit includes a chopper ($M_1$, $M_2$, shown with their body diodes $D_{M1}$ and $D_{M2}$), a series resonant tank ($C_s$, $L_s$), a high frequency isolation transformer (T), a rectifying circuit ($D_1$, $D_2$) and an output filter ($C_f$). The function of the chopper is to convert the DC input voltage ($V_g$) to a high frequency AC voltage. The series resonant tank converts this AC voltage into oscillatory (i.e., substantially sinusoidal) current (i), with low frequency voltage components. This feature is useful, when, for example, the load is an inverter which is injecting the power into a power distribution grid. Low frequency ripple generated by the inverter may be substantially blocked by the resonant tank, preventing it from appearing at the input and allowing use of small energy-storage capacitors. The high frequency transformer provides matching and isolation for the output voltage. The rectifying circuit and the output filter convert the high frequency resonant current into a DC output voltage. The load $R_L$ may be a DC load, a converter stage, or a converter and/or inverter stage, as shown in FIG. 2. For example, the load may be an inverter that produces AC output power suitable for injection into a power distribution grid.

As used herein, the term "low frequency" refers to a harmonic frequency that is derived from the AC grid frequency.

As used herein, the term "high frequency" refers to a switching frequency of the converter and one or more harmonics thereof.

Figure 3B:
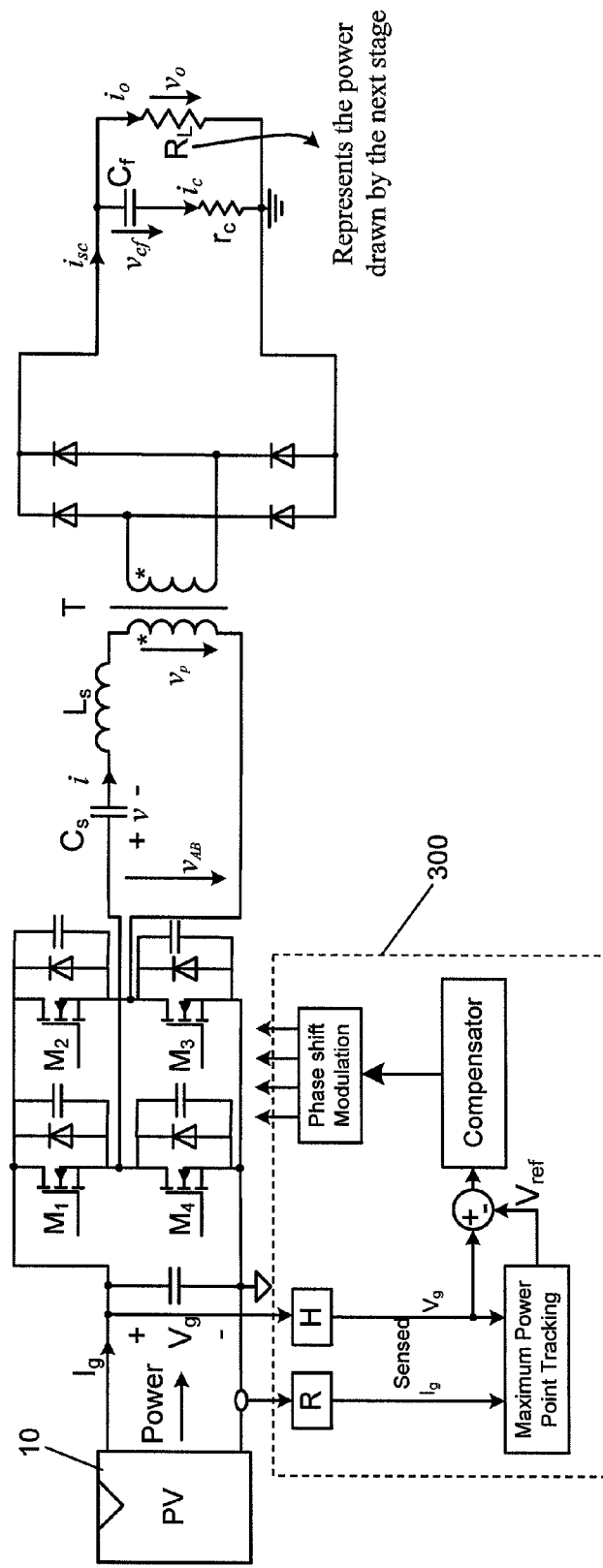
FIG. 3(b) is a circuit diagram of a micro-inverter with maximum power point tracking according to another embodiment.

An alternative embodiment is shown in FIG. 3(b). This embodiment is based on a full bridge resonant converter with a series resonant tank. The full bridge may be controlled using a modified phase shift modulation technique. Soft switching of the power MOSFET switches $M_1$-$M_4$ may be achieved by tuning the resonant frequency of the series resonant tank circuit $C_s$-$L_s$ lower than the operation frequency of the resonant inverter. This is an inductive mode where the impedance viewed from the input port of the resonant tank $Z_{in}$ becomes inductive. Resonant current lags the fundamental voltage and as a result θ becomes positive. Switches $M_1$ and $M_3$ turn on during negative current, therefore, they have zero voltage turn on because current always transfers from the anti-parallel diode to the MOSFET. The scenario is the same for switches $M_2$ and $M_4$. All the switches turn off under non-zero resonant current. Snubber capacitors may be used to reduce turn-off switching losses.

Figure 3C:
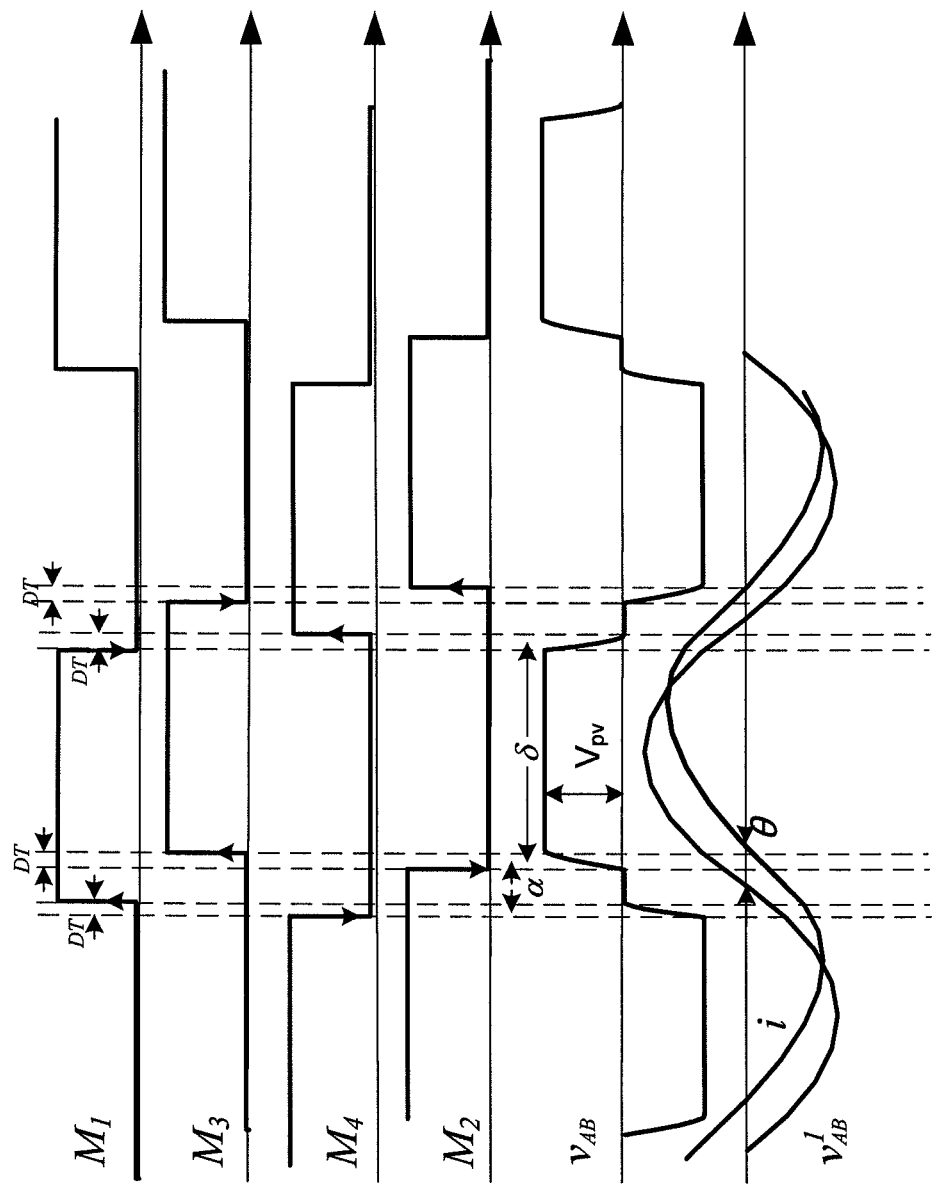
FIG. 3(c) is a plot showing operating waveforms of the circuit of FIG. 3(b).

Principle operating waveforms of the embodiment of FIG. 3(b) are shown in FIG. 3(c). The output voltage of the converter ($v_{ab}$) is regulated through the change of the phase shift a between the two pulses for $M_1$ and $M_3$ in FIG. 3(c). The phase shift angle increases when the input capacitor voltage decreases, and the phase shift angle decreases when the input capacitor voltage increases. In this manner, regardless of the output load ($R_L$) stipulated by the next stage, or environmental conditions for the PV module, the input voltage can be regulated to remove, reduce, or minimize oscillations from the input port and to substantially avoid deviation from the maximum power point.

The embodiment of FIGS. 2 and 3(a) will now be described in detail. The inverter output current controller forces the current to be in-phase with the grid voltage. Since the input power extraction from the power generator is DC, the power oscillation will be drawn from the bus capacitor $C_{bus}$ and the resonant tank passive elements. As a result the passive components may be small. With some simplification, bus voltage oscillation may be derived as follows:

$$\Delta V_{bus} = \frac{P_{in}}{\omega_g C_{bus} V_{bus}^{DC}}, \qquad (1)$$

This equation shows that for a given DC bus voltage and input power, if the bus voltage variation is large a smaller bus capacitor may be selected. For example, in a conventional approach the bus voltage variation may be 1 volt, whereas in the embodiments described herein, the voltage variation may be 20 volts, so the capacitor may be 20 times smaller. The bus voltage can be estimated as:

$$v_{bus}(t) = \sqrt{(V_{bus}^{DC})^2 + \frac{P_{in}}{\omega_g C_{Bus}}\sin(2\omega_g t)} \qquad (2)$$

As a result the equivalent resistance of the embodiment may be calculated as:

$$R_{ac}(t) = \frac{(V_p^1(t))^2}{2P_{SRC}^2} \qquad (3)$$
$$= \frac{\left(\frac{4v_{bus}(t)}{\pi N}\right)^2}{2P_{in}}$$
$$= \frac{8}{\pi^2 N^2 P_{in}}\left((V_{bus}^{DC})^2 + \frac{P_{in}}{\omega_g C_{bus}}\sin(2\omega_g t)\right)$$

The maximum and minimum of this equation are used in the following discussion to estimate maximum and minimum of $R_L$.

Figure 4B:
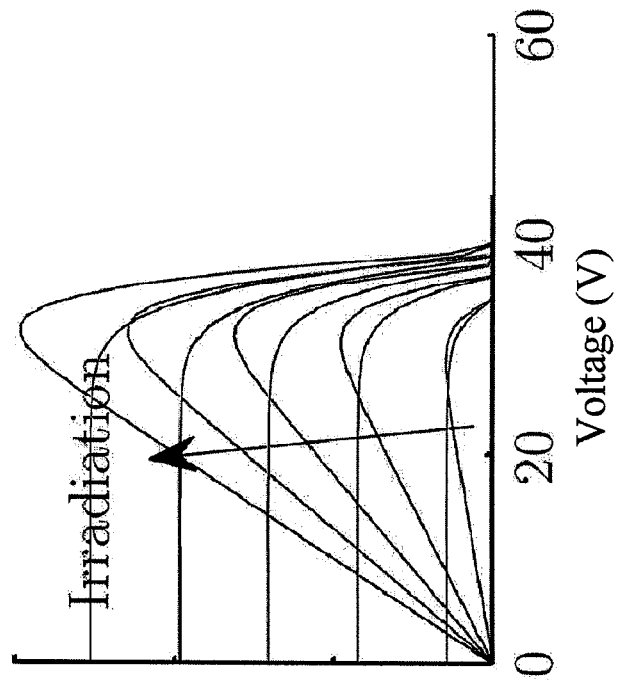
FIG. 4(b) is a plot showing how the characteristics change with amount of irradiation.
Figure 4A:
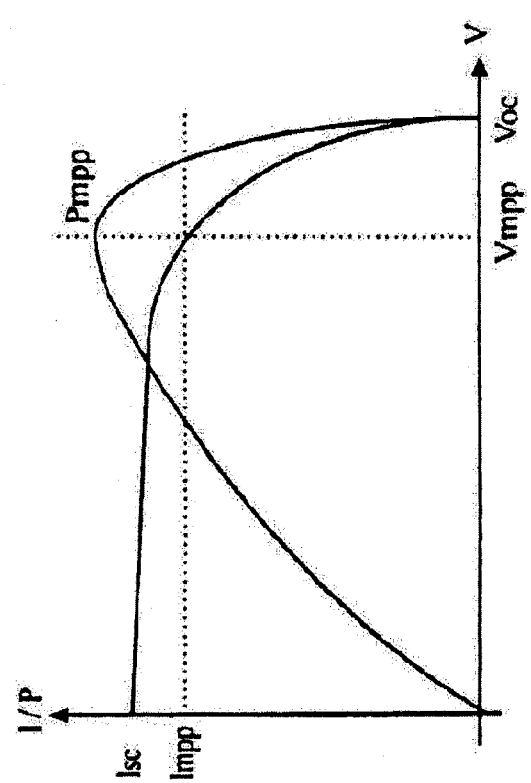
FIG. 4(a) is a plot showing typical current-voltage and power-voltage characteristics and the maximum power point of a PV cell.

Various techniques may be used to control the switches of the chopper. For example, a modified pulse-width-modulation (PWM) technique may be used. For example, in the embodiment of FIG. 3(a), an asymmetrical pulse-width-modulation (APWM) technique is shown. A PV cell may be connected directly to the input of the resonant converter, as shown in FIG. 3(a). A challenge in using PV cells is presented by their nonlinear current-voltage (I-V) characteristics, which result in a unique maximum power point (MPP) on the power-voltage (P-V) curve, as shown in FIG. 4. Therefore, to achieve maximum power point tracking ability, the resonant converter can control its input voltage, so that it can operate at any point of the PV cell I-V curve, or at least at points near the maximum power point (MPP). The output voltage of the resonant converter may be regulated by a grid-connected inverter.

An embodiment of an APWM series resonant converter control scheme is shown in FIG. 3(a). This embodiment includes a MPPT block 310 that receives the input current $I_g$ and voltage $V_g$ information from voltage and current sensor blocks H and R, respectively, a subtractor 320, a duty cycle controller 330, and an APWM modulator 340 that produces the gate signals for switches $M_1$ and $M_2$. In one embodiment the duty cycle controller may include a proportional integral-derivative (PID) compensator. The MPPT block generates a reference voltage ($V_{ref}$) which is compared with $V_g$ and the result fed to the PID compensator. The PID compensator forces the input voltage to follow the voltage reference generated by the MPPT block.

Figure 5:
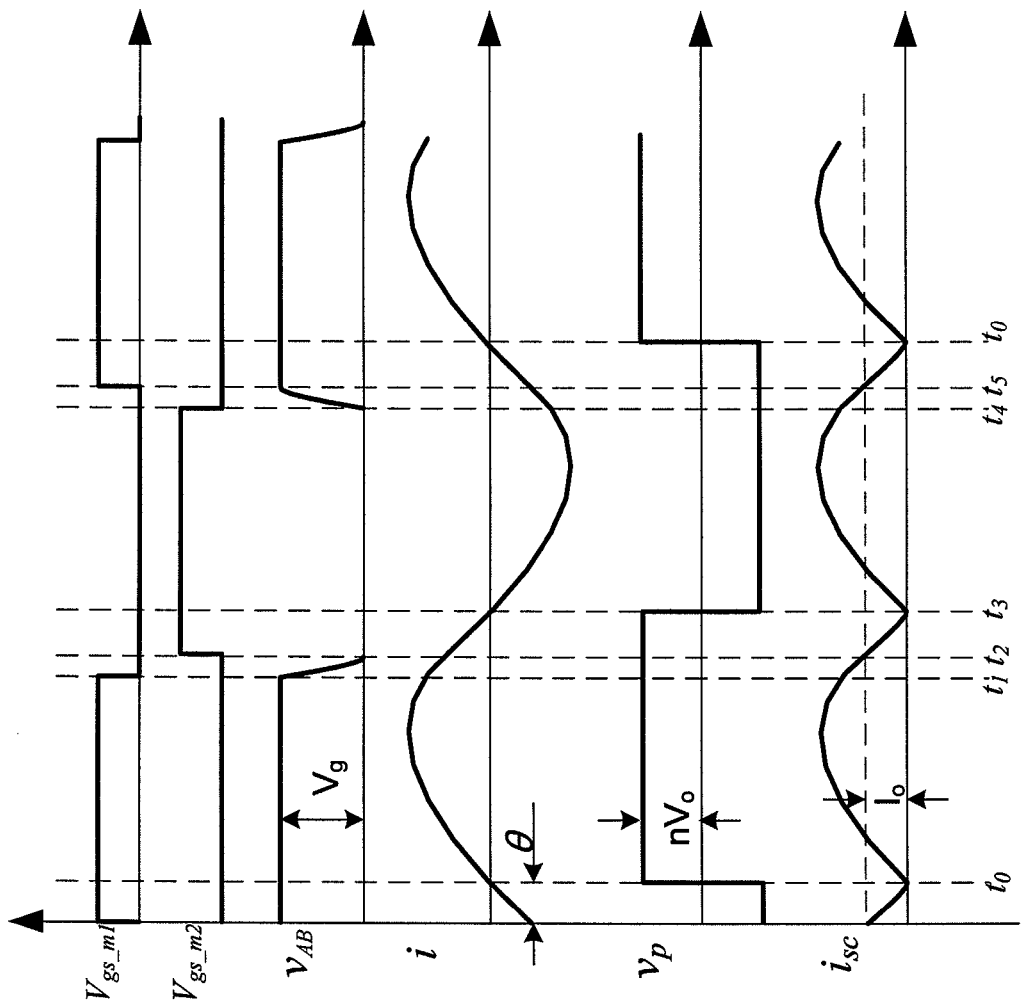
FIG. 5 is a plot showing typical steady-state operating waveforms of the embodiment of FIG. 2.
Figure 6:
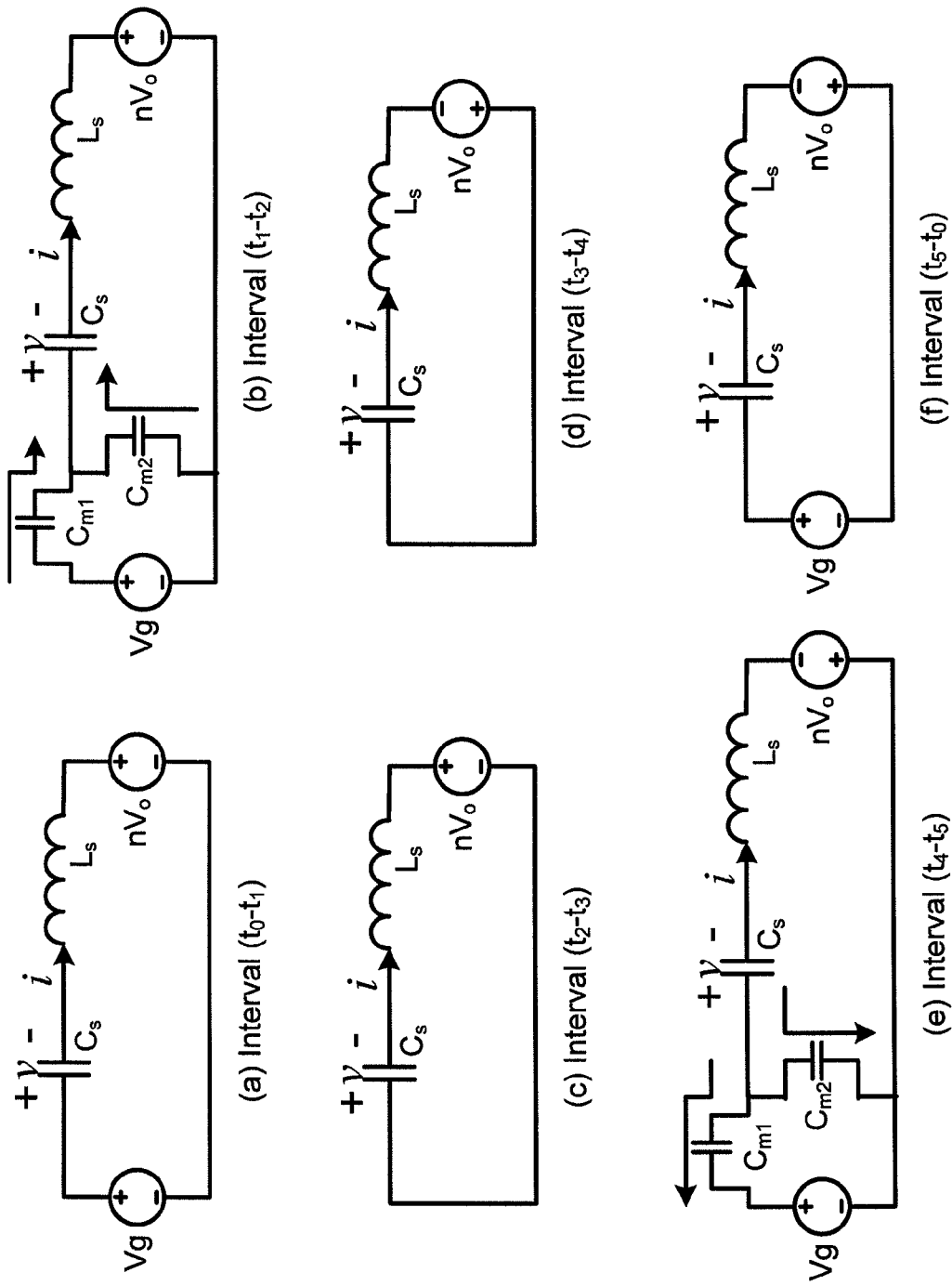
FIGS. 6(a) to (f) show schematic diagrams of equivalent circuits of the embodiment of FIG. 3(a), for each interval of the plot of FIG. 5.

Operation of the series resonant converter of FIG. 3(a) will now be described with reference to the plot of typical steady state operating waveforms shown in FIG. 5, and the equivalent circuits shown in FIG. 6. The equivalent circuits show the inherent output capacitances $C_{m1}$ and $C_{m2}$ of $M_1$ and $M_2$, respectively.

Interval ($t_0$-$t_1$): At $t_0$, the resonant current i is crossing zero. During this interval, $M_1$ is on and $M_2$ is off. The output voltage $V_{AB}$ of the chopper is $V_g$. Current $i_{sc}$ flows through the diode $D_2$. The voltage on the primary side of the transformer T is $nV_o$, neglecting the voltage drop of the diode. At $t_1$, $M_1$ is turned off for voltage regulation.

Interval ($t_1$-$t_2$): At the beginning of this interval, $M_1$ is turned off. The positive current flowing through the resonant branch forces the charging of the output capacitance $C_{m1}$ of main switch $M_1$ and the discharging of the output capacitance $C_{m2}$ of $M_2$. Once $C_{m1}$ has fully charged and $C_{m2}$ has fully discharged, the current forces the conduction of body diode $D_{m2}$ of $M_2$. At $t_3$, $M_2$ is turned on to achieve zero voltage switching (ZVS).

Interval ($t_2$-$t_3$): During this interval, $M_1$ is off and $M_2$ is on. $D_1$ is off and $D_2$ is still on. The output voltage $v_{AB}$ of the chopper is zero. The voltage on the primary side of transformer is $nV_o$. At $t_3$, the resonant current is crossing zero.

Interval ($t_3$-$t_4$): The resonant current changes its direction at $t_3$. It forces conduction of the diode $D_1$. During this interval, $M_2$ and $D_1$ are on, and $M_1$ and $D_2$ are off. The output voltage $v_{AB}$ of the chopper is zero. The voltage on the primary side of transformer also changes its direction, $-nV_o$. At $t_4$, $M_2$ is turned off.

Interval ($t_4$-$t_5$): At the beginning of this interval, $M_2$ is turned off. The negative current flowing through the resonant branch forces the discharging of the output capacitance $C_{m1}$ of main switch $M_1$ and the charging of the output capacitance $C_{m2}$ of $M_2$. Once $C_{m1}$ has fully discharged and $C_{m2}$ has fully charged. The current forces the conduction of body diode $D_{m1}$ of $M_1$. At $t_5$, $M_1$ is turned on to achieve zero voltage switching (ZVS).

Interval ($t_5$-$t_0$): During this interval, $M_1$ is on and $M_2$ is off. $D_2$ is off and $D_1$ is on. The output voltage $v_{AB}$ of the chopper is $V_g$. The voltage on the primary side of transformer is $-nV_o$. At $t_0$, the resonant current i is crossing zero. The current through the diode $D_1$ goes to zero. Another operating cycle begins.

Steady-State Analysis

The AC equivalent resistance is given by:

$$R_{ac} = \frac{V_p(\text{RMS})}{I_r(\text{RMS})} = \frac{8 \cdot n^2 \cdot R_L}{\pi^2} \tag{4}$$

The voltage $v_{AB}$ on the input of the resonant tank: also can be given using Fourier series:

$$v_{AB}(t) = D_m \cdot V_g + \sum_{k=1}^{\infty} \left[ \frac{2V_g \cdot \sin(k \cdot D \cdot \pi)}{k\pi} \cdot \cos(k \cdot \omega_o \cdot t - k \cdot D \cdot \pi) \right] \tag{5}$$

Where $\omega_0$ is the switching frequency and D is the duty cycle. The following qualities are defined as:

$$\omega_r = \frac{1}{\sqrt{L_s \cdot C_s}} \tag{6}$$

$$\omega = \frac{\omega_o}{\omega_r}$$

$$Q_o = \frac{\omega_r \cdot L_s}{R_{ac}}$$

$$V_{AB(k)}(t) = \frac{2V_g \cdot \sin(k \cdot D \cdot \pi)}{k\pi} \cdot \cos(k \cdot \omega_o \cdot t - k \cdot D \cdot \pi)$$

Figure 7:
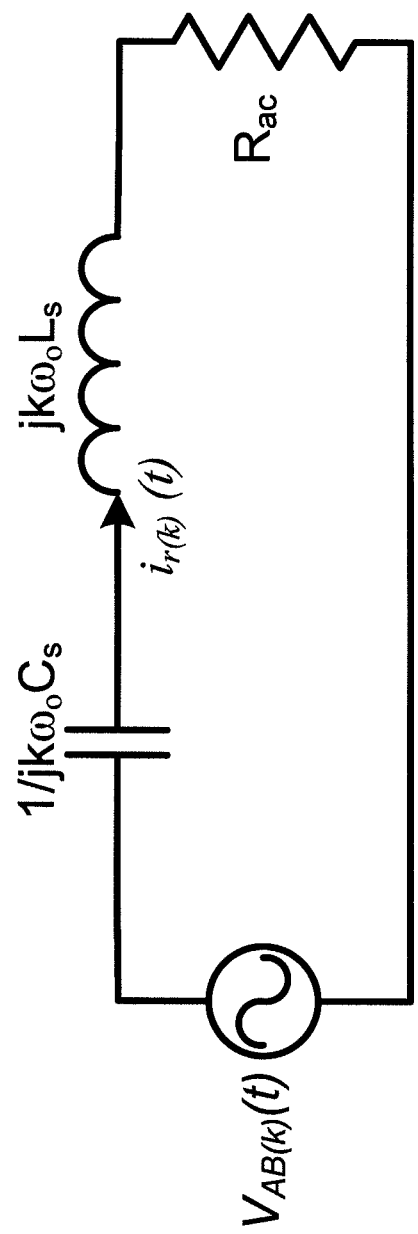
FIG. 7 is a circuit diagram showing the kth harmonic equivalent circuit of the circuit in FIG. 2.

The kth harmonic equivalent circuit is shown in FIG. 7. The resonant current it may be expressed as:

$$i_r(t) = \sum_{k=1}^{\infty} \left[ \frac{2V_g \cdot \sin(k \cdot D \cdot \pi)}{k\pi \cdot Z_{ink}} \cdot \cos(k \cdot \omega_o \cdot t - k \cdot D \cdot \pi - \theta_k) \right] \tag{7}$$

$$Z_{ink} = R_{ac} \cdot \left[ 1 + Q_o^2 \cdot \left( k\omega - \frac{1}{k\omega} \right)^2 \right]^{1/2}$$

$$\theta_k = \arctan\left[ Q_o \cdot \left( k\omega - \frac{1}{k\omega} \right) \right]$$

To achieve ZVS for $M_1$, the current at the turn off of $M_2$ must be negative, as given by (8):

$$I_2 = \sum_{k=1}^{\infty} \left[ \frac{2 \cdot V_g \cdot \sin(k \cdot D \cdot \pi)}{k\pi \cdot R_{ac} \cdot \left[ 1 + Q_o^2 \cdot \left( k\omega - \frac{1}{k\omega} \right)^2 \right]^{1/2}} \cdot \cos(-k \cdot D \cdot \pi - \theta_k) \right] \tag{8}$$

To achieve ZVS for $M_2$, the current at the turn off of $M_1$ must be positive, as given by (9):

$$I_1 = \sum_{k=1}^{\infty} \left[ \frac{2 \cdot V_g \cdot \sin(k \cdot D \cdot \pi)}{k\pi \cdot R_{ac} \cdot \left[ 1 + Q_o^2 \cdot \left( k\omega - \frac{1}{k\omega} \right)^2 \right]^{1/2}} \cdot \cos(k \cdot D \cdot \pi - \theta_k) \right] \tag{9}$$

Figure 8A:
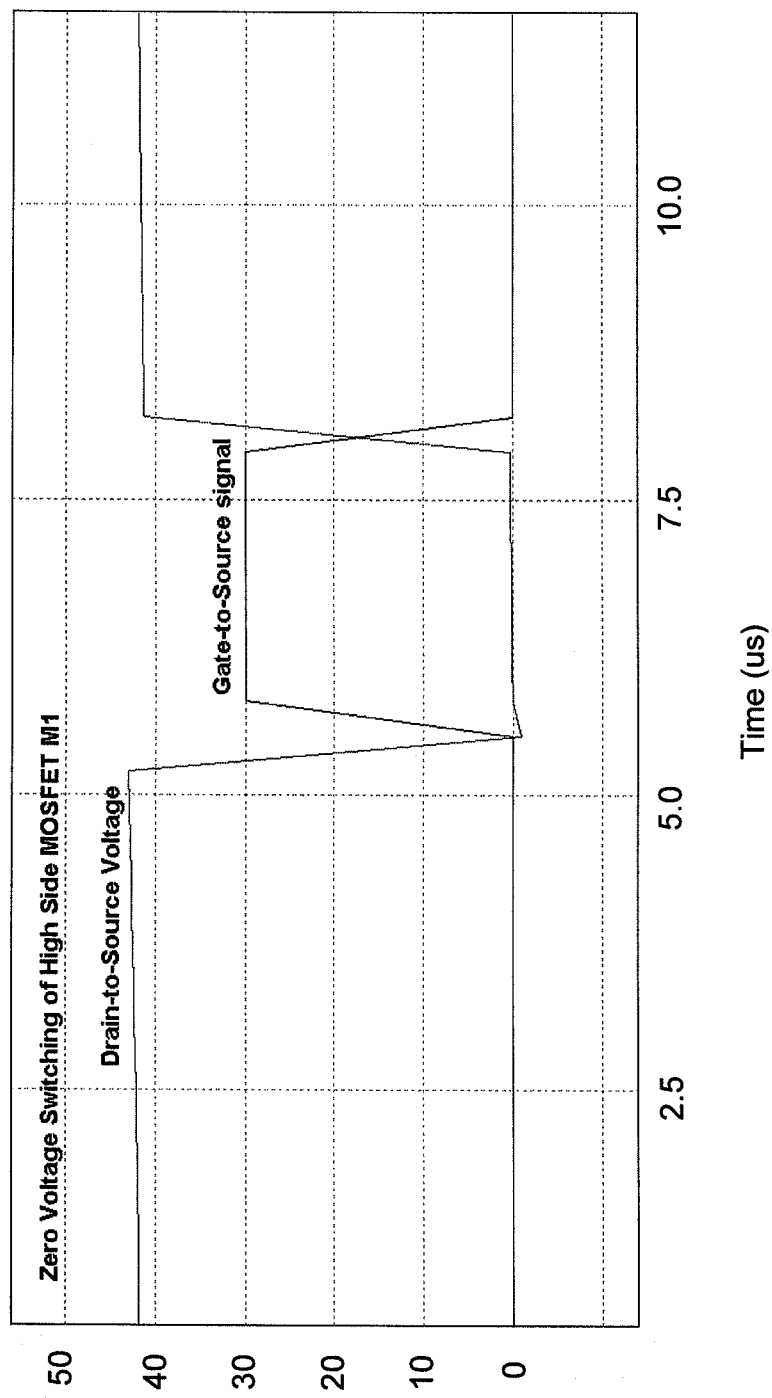
FIGS. 8(a) and (b) are plots showing zero voltage switching of the switches $M_1$ (a) and $M_2$ (b) of FIG. 3(a), obtained from a simulation.
Figure 8B:
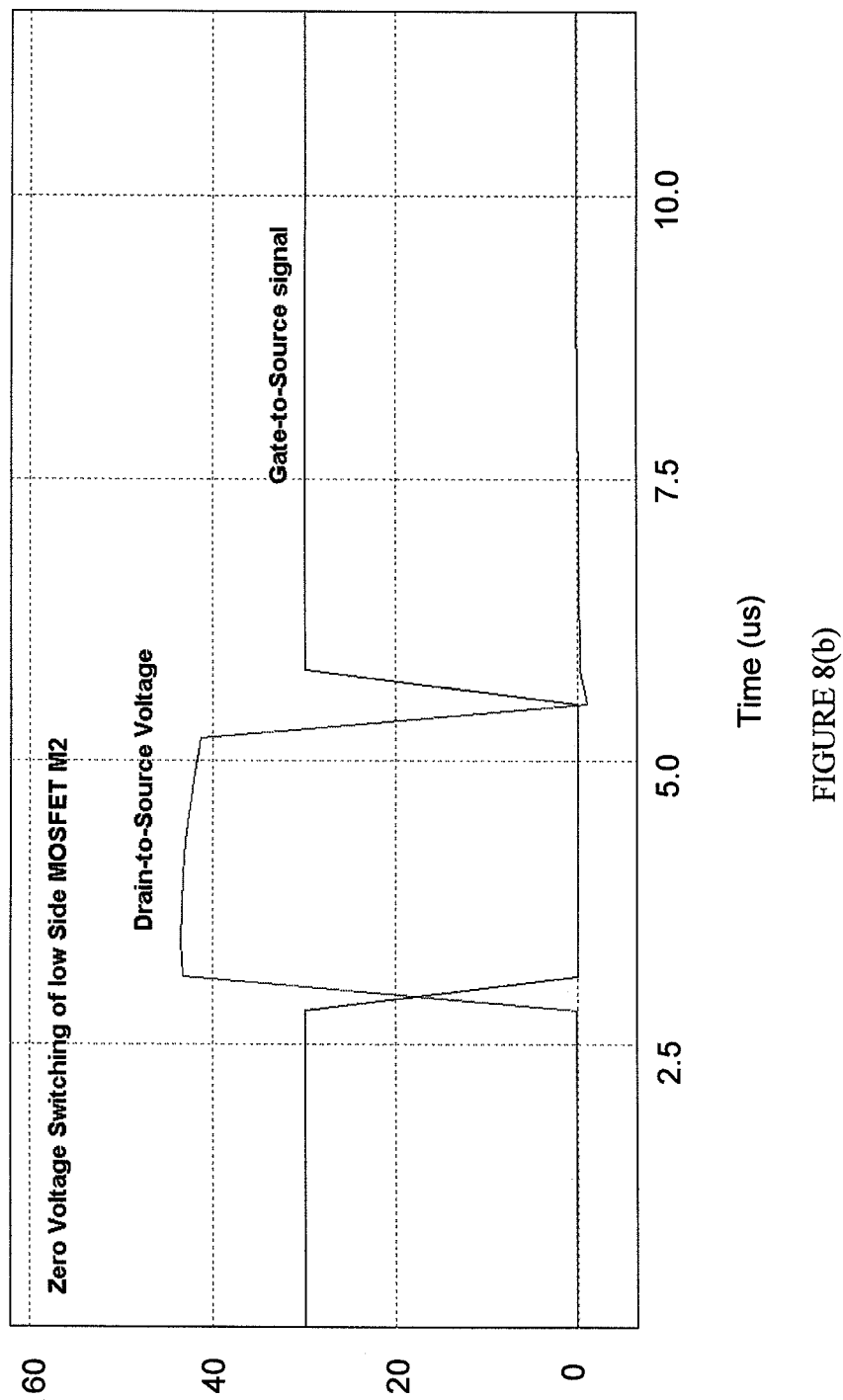

As an example, FIGS. 8(a) and (b) illustrate zero voltage switching of both switches, obtained from a simulation using PSIM™ software version 9 (Powersim Inc., Woburn, Mass.).

Embodiments have been described herein using a voltage input. The embodiments can also be configured to work with a current input.

Modified Pulse Width Modulation

There may be input power oscillation from the power generator. In such case, maximum power is only achievable at the peak of oscillation, which translates into less average power extraction than the available maximum power. This is a power loss that reduces the efficiency of PV systems, and substantially the same problem exists in systems with wind turbines or fuel cells as the power generators, for single phase systems or unbalanced three phase systems. Therefore, power oscillation is a key problem in such systems and the converter should decouple the output power oscillation from the input DC power generation to maximize efficiency. Power decoupling is conventionally performed passively by using large electrolytic capacitors to minimize the effect of the output power oscillation on the input operating point. However, use of large capacitors increases the size and weight of the converter, and lowers reliability, resulting in high maintenance costs.

Figure 9:
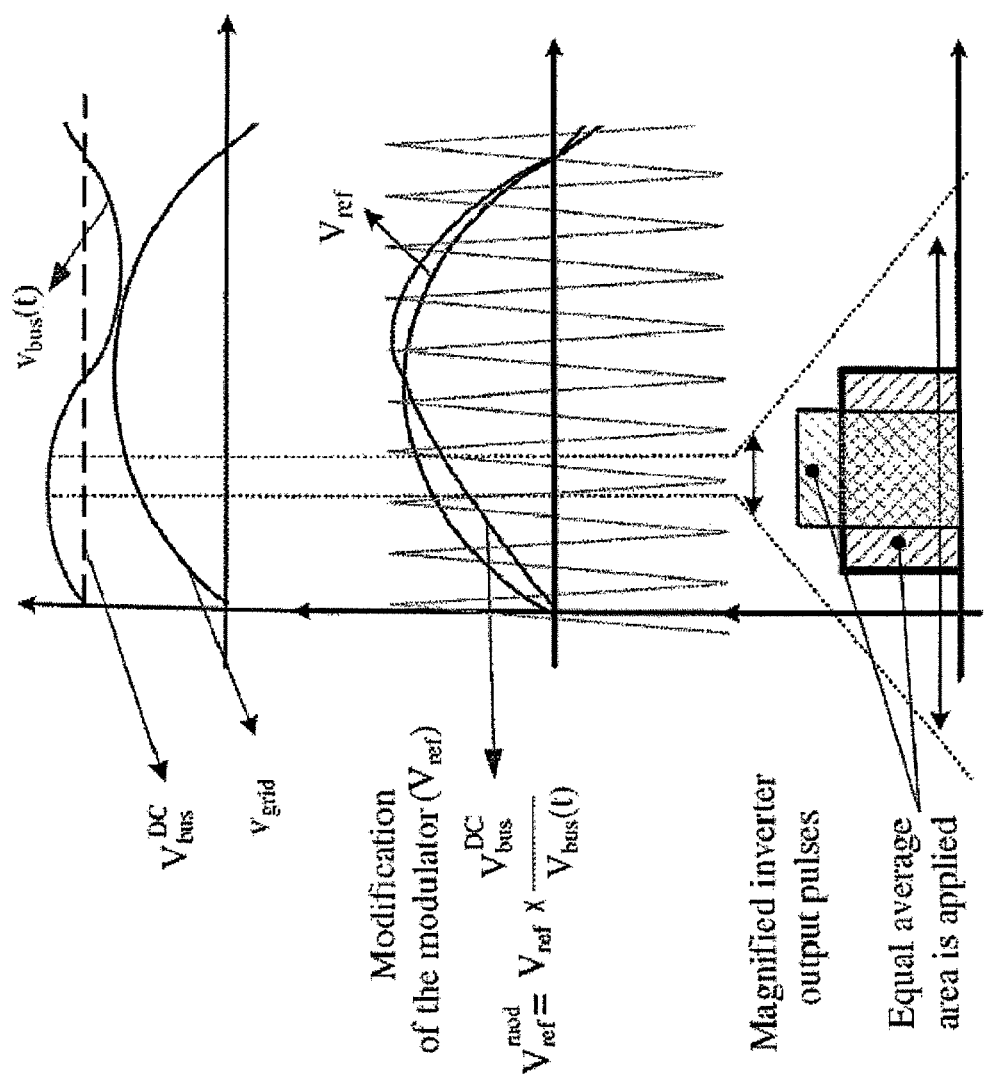
FIG. 9 is a plot showing the bus and grid voltage waveforms and the gate signals for the embodiment of FIG. 3(a) using modified pulse width modulation as described herein.

The decoupling control method used in the converter described herein removes double frequency oscillations from the input power generator source. As shown in FIG. 9, this oscillation is displaced to the middle bus voltage ($V_{bus}$) that oscillates around a DC value at twice the grid frequency. A bus voltage controller regulates the DC value of the bus voltage so that the lowest value of the bus voltage is higher than the peak of the grid voltage, otherwise it results in a discontinuous mode of operation where the output current becomes distorted.

As noted above, a modified pulse width modulation (PWM) technique is used to generate the output current in the presence of bus voltage ripples. If a conventional PWM technique was used in the presence of ripples, this double frequency harmonic would be multiplied by the fundamental harmonic of the carrier, creating first and third harmonics at the output current. Such a detrimental low frequency harmonic should be avoided.

Figure 10:
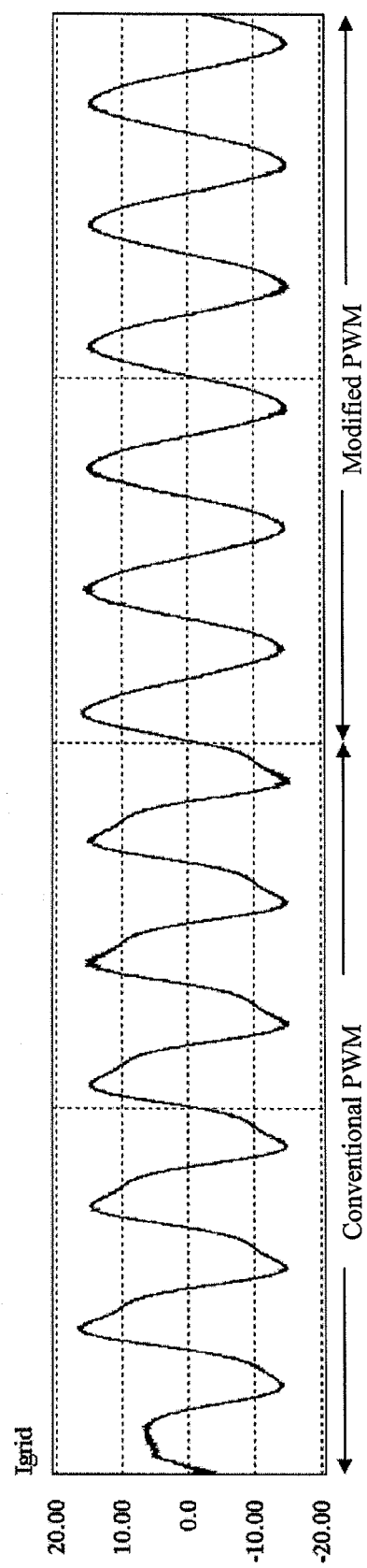
FIG. 10 is a plot showing output grid current waveform with conventional pulse width modulation and with modified pulse width modulation.

This problem is avoided by the controller described herein. In the modified PWM technique, an active compensation factor is generated as shown in FIG. 9. When the oscillatory input DC voltage increases, the compensation decreases the modulation index proportionally. As a result, an increase in the DC current value is compensated by a reduction in the modulation pulse width, and vice versa. Therefore, the inverter output voltage average over one switching cycle will be equal to the case where the bus was a constant voltage. This compensation prevents the oscillatory harmonics from appearing at the output current because the energy transfer to the output will be equivalent to the case where the bus voltage was a constant DC with no oscillation. FIG. 10 shows two cases; at the beginning the compensation factor is not applied and the output current harmonics appear. In the second half of the waveform the modified PWM is applied and the output current has been fully compensated and contains no low order harmonic component.

Figure 11:
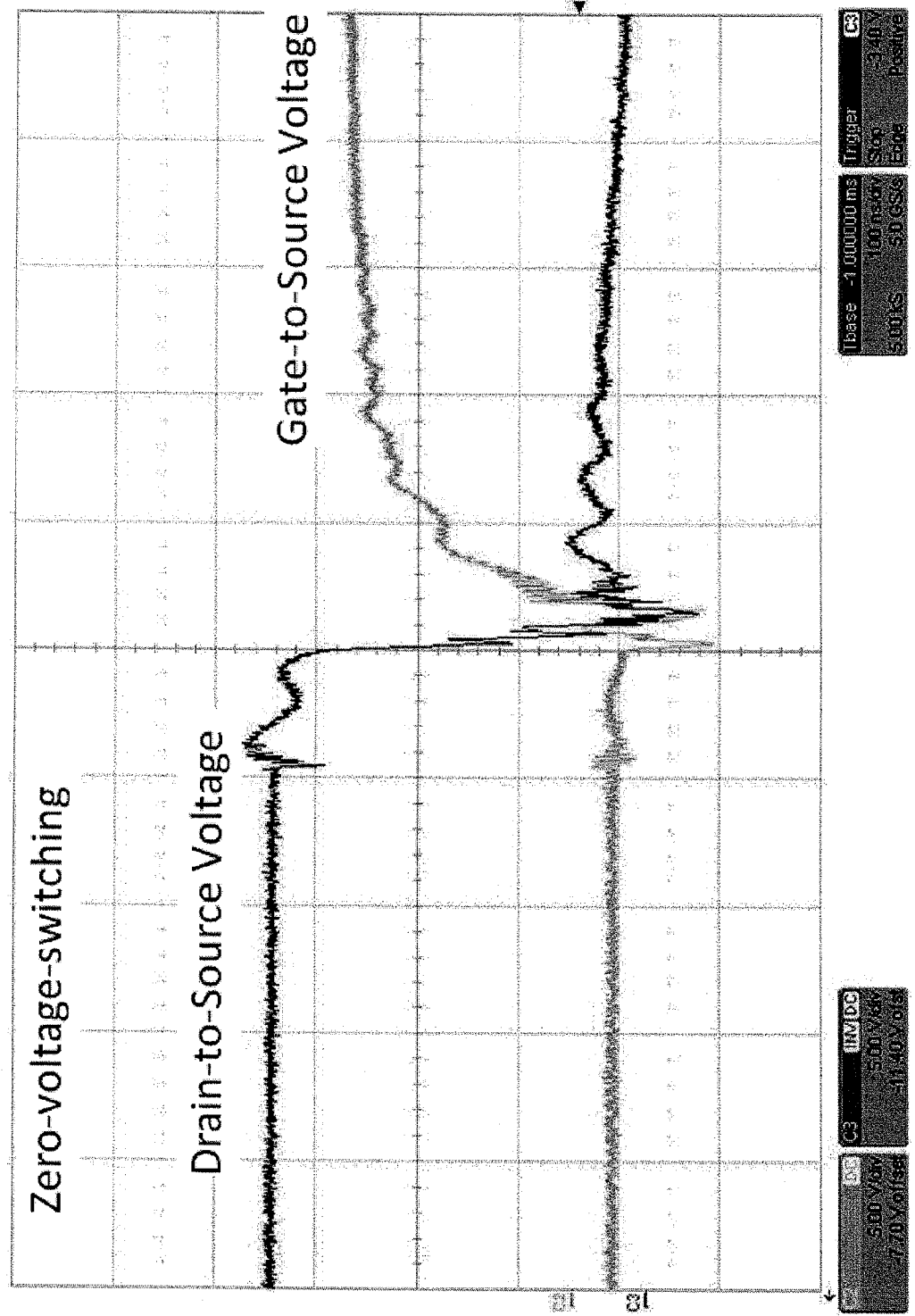
FIG. 11 is a plot showing zero voltage switching of a simulation based on the circuit of FIG. 3(a).
Figure 12:
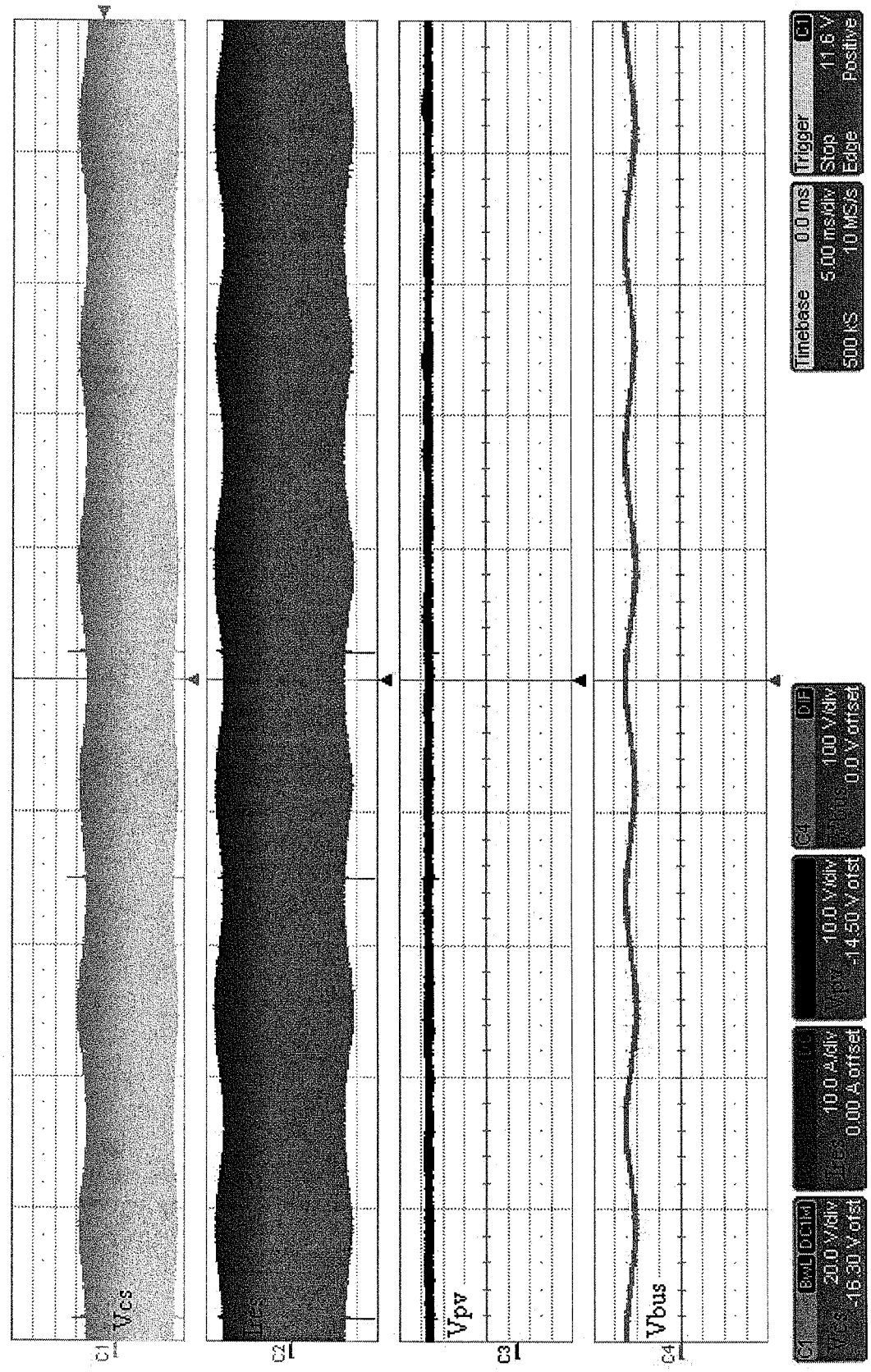
FIG. 12 is a plot showing bus voltage and resonant tank current and voltage of a simulation based on the circuit of FIG. 3(a).

The following non-limiting example is provided to further illustrate the invention.
Working Example A simulation of a converter based on the schematic of FIG. 3(a) was carried out using PSIM software version 9 (Powersim Inc., Woburn, Mass.). FIGS. 11 and 12 show experimental results. FIG. 11 shows zero voltage switching of the converter switches. FIG. 12 shows that the bus voltage and the resonant tank current and voltage all have low frequency oscillations, without affecting the input operating point. FIG. 12 also shows that the oscillatory power is being supplied from all of these passive components and this is the reason that the components are optimized.

The contents of all references, pending patent applications, and published patents cited throughout this application are hereby expressly incorporated by reference.

EQUIVALENTS

Those skilled in the art will recognize or be able to ascertain variants of the embodiments described herein. Such variants are within the scope of the invention and are covered by the appended claims.

REFERENCES

[1] S. B. Kjaer, J. K. Pedersen, and F. Blaabjerg, "A review of single-phase grid connected inverters for photovoltaic modules," IEEE Transactions on Industry Applications, vol. 41, no. 5, pp. 1292-1306, September/October 2005.
[2] Y. Xue, L. Chang, S. B. Kjaer, J. Bordonau, and T. Shimizu, "Topologies of single-phase inverters for small distributed power generators: an overview," IEEE Transactions on Power Electronics, vol. 19, no. 5, pp. 1305-1314, September 2004.
[3] C. Rodriguez and G. Amaratunga, "Long-lifetime power inverter for photovoltaic AC modules," IEEE Transactions on Industrial Electronics, vol. 55, no. 7, pp. 2593, September 2004
[4] F. Blaabjerg, R. Teodorescu, Z. Chen, and M. Liserre, "Power converters and control of renewable energy systems," in Plenary Speech ICPE trol of renewable energy sy
[5] T. Shimizu, K. Wada, and N. Nakamura, "A flyback-type single phase utility interactive inverter with low-frequency ripple current reduction on the DC input for an AC photovoltaic module system," Power Electronics Specialists Conference, PESC '02. IEEE 33rd Annual, vol. 3, pp. 1483-1488, 2002.
[6] S. B. Kjaer and F. Blaabjerg, "Design optimization of a single phase inverter for photovoltaic applications," Power Electronics Specialist Conference, PESC for IEEE 34th Annual, vol. 3, pp. 1183-1190, June 2003.
[7] T. Hirao, T. Shimizu, M. Ishikawa, and K. Yasui, "A modified modulation control of a single-phase inverter with enhanced power decoupling for a photovoltaic AC module," Power Electronics and Applications, 2005 European Conference on, September 2005.
[8] B. M. T. Ho and H. S.-H. Chung, "An integrated inverter with maximum power tracking for grid-connected PV systems," IEEE Transactions on Power Electronics, vol. 20, no. 4, pp. 953ower Electronics
[9] F. Shinjo, K. Wada, and T. Shimizu, "A single-phase grid-connected inverter with a power decoupling function," Power Electronics Specialists Conference PESC '07, IEEE, pp. 1245-1249, June 2007.
[10] P. T. Krein, R. S. Balog, "Cost-Effective Hundred-Year Life for Single-PhaseInverters and Rectifiers in Solar and LED Lighting Applications Based on Minimum Capacitance Requirements and a Ripple Power Port," Applied Power Electronics Conference and Exposition, 2009, APEC 2009. Twenty-Fourth Annual IEEE, pp: 620-62.

The invention claimed is:
1. A power converter for use with a power generator, comprising:
a high side input point and a low side input point for receiving substantially DC power from the power generator;
an input capacitor connected across the high side and low side input points;
a first circuit that receives voltage across the capacitor and converts the voltage into a high frequency AC voltage while rejecting or minimizing oscillations in the received voltage;

a second circuit that converts the high frequency AC voltage into a high frequency substantially sinusoidal AC voltage or current;

a third circuit, including an energy storage component, that converts the high frequency substantially sinusoidal AC voltage or current from the second circuit into (i) a bus voltage comprising a low frequency substantially sinusoidal AC output voltage and a DC voltage; or (ii) a bus current comprising a low frequency substantially sinusoidal AC current and a DC current; and a fourth circuit that converts the bus voltage or the bus current into an AC current for delivery to a power distribution grid at a power distribution grid frequency;

wherein the high frequency substantially sinusoidal AC voltage is isolated from the bus voltage, or the high frequency substantially sinusoidal AC current is isolated from the bus current.

2. The power converter of claim 1, wherein the first circuit comprises a chopper circuit.

3. The power converter of claim 2, wherein switches of the chopper circuit are controlled using pulse width modulation.

4. The power converter of claim 1, wherein the second circuit comprises a resonant circuit.

5. The power converter of claim 4, wherein the resonant circuit is a series resonant circuit.

6. The power converter of claim 1, wherein the fourth circuit comprises a rectifier and an inverter controlled using modified pulse width modulation.

7. The power converter of claim 1, wherein the power generator is a photovoltaic (PV) cell or a fuel cell.

8. The power converter of claim 1, wherein the power generator is at least one PV cell.

9. A micro-inverter for a distributed power generator, comprising:
the power converter of claim 1; and
a controller coupled to the power converter that controls operation of switches in the power converter.

10. The micro-inverter of claim 9, wherein the controller includes one or more of a modified pulse width modulator, a duty cycle controller, and a maximum power point tracker.

11. The micro-inverter of claim 9, wherein the duty cycle controller comprises a proportional integral-derivative compensator.

12. A power generation system, comprising:
at least one micro-inverter of claim 9; and
at least one power generator.

13. The system of claim 12, wherein each power generator is connected to a micro-inverter.

14. The system of claim 12, wherein the power generator is a photovoltaic (PV) cell or a fuel cell.

15. The system of claim 12, wherein the power generator is at least one PV cell.

16. The micro-inverter of claim 9 integrated into a PV cell or module.

17. The micro-inverter of claim 16, wherein the micro-inverter includes one or more feature selected from communication, inversion (DC to AC conversion), peak power tracking, and islanding.

18. The micro-inverter of claim 16, wherein integration of the micro-inverter with the PV cell or module includes packaging of the micro-inverter either substantially together or incorporated into the module packaging, or in a manner that substantially unifies the micro-inverter with the module packaging.

19. The micro-inverter of claim 18, wherein the PV cell or module packaging is pre-existing or is designed to accommodate the micro-inverter.

20. The micro-inverter of claim 17, wherein an inversion portion of the micro-inverter is of a design selected from current source, voltage source, and resonant, and may include single or multiple power stages.

21. The power converter of claim 1, wherein a value of the energy storage component is minimized so as to maintain the bus voltage greater than the power distribution grid voltage, or so as to maintain the bus current greater than the current delivered to the power distribution grid.

22. The power converter of claim 1, wherein the energy storage component comprises capacitance.

23. The power converter of claim 22, wherein the capacitance is minimized so as to maintain the bus voltage greater than the power distribution grid voltage.

24. The micro-inverter of claim 9, wherein the controller compares the voltage across the input capacitor with a reference voltage and minimizes voltage fluctuations across the input capacitor.

25. The micro-inverter of claim 10, wherein the modified pulse width modulator regulates AC current for delivery to a power distribution grid at a power distribution grid frequency based on an active compensation factor.

26. A method for obtaining power from a power generator, comprising:
converting substantially DC output power from the power generator into a high frequency AC voltage while rejecting or minimizing oscillations in the output power from the power generator;
converting the high frequency AC voltage into a high frequency substantially sinusoidal AC voltage or current;
converting the high frequency substantially sinusoidal AC voltage or current into (i) a bus voltage comprising a low frequency substantially sinusoidal AC voltage and a DC voltage; or (ii) a bus current comprising a low frequency substantially sinusoidal AC current and a DC current; and
converting the bus voltage or the bus current into an AC current for delivery to a power distribution grid at a power distribution grid frequency;
wherein the high frequency substantially sinusoidal AC voltage is isolated from the bus voltage, or the high frequency substantially sinusoidal AC current is isolated from the bus current.

27. The method of claim 26, comprising using a chopper to convert output power from the power generator into a high frequency AC voltage.

28. The method of claim 27, comprising using pulse width modulation to control one or more switches of the chopper circuit.

29. The method of claim 28, including comparing the output voltage of the power generator with a reference voltage so as to minimize voltage fluctuations of the power generator.

30. The method of claim 26, comprising using a resonant circuit to convert the high frequency AC voltage into a high frequency substantially sinusoidal AC voltage or current.

31. The method of claim 30, comprising using a series resonant circuit.

32. The method of claim 26, wherein the power generator is a photovoltaic cell or a fuel cell.

33. The method of claim 26, wherein the power generator is at least one PV cell.

34. The method of claim 26, including:
converting the high frequency substantially sinusoidal AC voltage or current into the bus voltage or the bus current using an energy storage component;
wherein a value of the energy storage component is minimized so as to maintain the bus voltage greater than a power distribution grid voltage, or so as to maintain the bus current greater than the current delivered to the power distribution grid.

35. The method of claim 34, comprising minimizing capacitance of the energy storage component.

36. The method of claim 26, comprising using modified pulse width modulation to regulate the DC voltage of the bus voltage or the DC current of the bus current based on an active compensation factor.

* * * * *

UNITED STATES PATENT AND TRADEMARK OFFICE
CERTIFICATE OF CORRECTION

PATENT NO. : 8,467,200 B2  
APPLICATION NO. : 13/094260  
DATED : June 18, 2013  
INVENTOR(S) : Shangzhi Pan et al.

Page 1 of 1

It is certified that error appears in the above-identified patent and that said Letters Patent is hereby corrected as shown below:

In the Claims

Column 13, claim 11, line 41: please replace "The micro-inverter of claim 9, wherein the duty cycle controller"
with --The micro-inverter of claim 9, wherein the controller--

Signed and Sealed this
Twelfth Day of November, 2013

Teresa Stanek Rea
*Deputy Director of the United States Patent and Trademark Office*